(12) United States Patent
Tanaka

(10) Patent No.: US 8,348,766 B2
(45) Date of Patent: Jan. 8, 2013

(54) GAME APPARATUS HAVING INPUT NAVIGATION FUNCTION AND ONLINE GAME PROGRAM

(75) Inventor: Motoko Tanaka, Tokyo (JP)

(73) Assignee: Square Enix Co., Inc., Tokyo (JP)

( * ) Notice: Subject to any disclaimer, the term of this patent is extended or adjusted under 35 U.S.C. 154(b) by 0 days.

(21) Appl. No.: 13/177,689

(22) Filed: Jul. 7, 2011

(65) Prior Publication Data
US 2012/0135807 A1 May 31, 2012

(30) Foreign Application Priority Data
Nov. 26, 2010 (JP) ................................. 2010-263278

(51) Int. Cl.
A63F 9/24 (2006.01)
A63F 13/00 (2006.01)

(52) U.S. Cl. .......................................... 463/42; 463/40

(58) Field of Classification Search ............... 463/40–42
See application file for complete search history.

(56) References Cited

U.S. PATENT DOCUMENTS

| | | | |
|---|---|---|---|
| 6,908,389 B1 * | 6/2005 | Puskala ........................... | 463/40 |
| 7,136,080 B1 * | 11/2006 | Kaminagayoshi et al. ... | 345/619 |
| 7,175,530 B2 * | 2/2007 | Takahashi et al. .............. | 463/41 |
| 7,455,590 B2 * | 11/2008 | Hansen et al. .................. | 463/40 |
| 7,814,154 B1 * | 10/2010 | Kandekar et al. ............. | 709/205 |
| 2002/0025853 A1 * | 2/2002 | Kojima et al. ................... | 463/42 |
| 2002/0049086 A1 * | 4/2002 | Otsu ................................ | 463/42 |
| 2002/0183114 A1 * | 12/2002 | Takahashi et al. .............. | 463/42 |
| 2003/0036431 A1 * | 2/2003 | Futatsugi et al. ............... | 463/43 |
| 2003/0134678 A1 * | 7/2003 | Tanaka ........................... | 463/42 |
| 2004/0157661 A1 * | 8/2004 | Ueda et al. ...................... | 463/31 |
| 2005/0192098 A1 * | 9/2005 | Guo et al. ........................ | 463/42 |
| 2006/0003824 A1 * | 1/2006 | Kobayashi et al. ............. | 463/1 |
| 2008/0139318 A1 * | 6/2008 | Van Luchene et al. ......... | 463/42 |
| 2008/0207327 A1 * | 8/2008 | Van Luchene et al. ......... | 463/42 |
| 2009/0291763 A1 * | 11/2009 | Guo et al. ........................ | 463/42 |
| 2010/0184516 A1 * | 7/2010 | Matsumura ..................... | 463/42 |

FOREIGN PATENT DOCUMENTS

| | | |
|---|---|---|
| JP | H11-232016 | 8/1999 |
| JP | 2002346230 A * | 12/2002 |

OTHER PUBLICATIONS

A translation of JP 2002-346230A. Machined English translation of abstracted, detailed description, claims, and description of drawings.*

* cited by examiner

Primary Examiner — Milap Shah
(74) Attorney, Agent, or Firm — Duane Morris LLP

(57) ABSTRACT

Input devices having different key structures are provided so as to selectively connect with a game apparatus. The game apparatus has means for discriminating a kind of the connected input device and storing its result, a memory for storing a key navigation table that sets keys to be operated with respect to action message delivered from a server, corresponding to kinds of the input devices, message display means for displaying the action message delivered from the server, and display means for displaying the key to be operated by the player corresponding to the discriminated input device as a guide icon by referring to the key navigation table when the action message is delivered.

3 Claims, 5 Drawing Sheets

GAME APPARATUS HAVING INPUT NAVIGATION FUNCTION AND ONLINE GAME PROGRAM

CROSS REFERENCE TO RELATED APPLICATION

The present disclosure relates to subject matter contained in Japanese patent application No. 2010-263278 filed on Nov. 26, 2010, the disclosure of which is expressly incorporated herein by reference in its entirety.

TECHNICAL FIELD

This invention relates to a game apparatus that can be connected with two or more input devices having different key structures, and especially relates to a game apparatus having an input navigation function wherein input keys necessary for operations can be guided and displayed on a screen and an online game program.

BACKGROUND ART

Recently, the input devices having various key structures can be connected with the game apparatus, such as controllers capable of generating various input signals by having various kinds of sensors and controllers having keyboards through which sentences for emails and chats can be inputted in addition to general controllers. According such a situation, a player who operates such an input device is necessary to input, corresponding to the key structure of each input device.

On the other hand, in a game program (apparatus) wherein a predetermined command can be inputted through successive operations of two or more keys, it has been proposed that two or more keys to be operated by the player are displayed on a screen of a display when inputting the command in order to reduce player's burden of memorizing orders of keys to be operated so as to support input operations, as shown in below-mentioned patent related document 1, for example.

PRIOR ART

[Patent related document 1]: Japanese patent application publication No. H11-232016

PROBLEMS TO BE SOLVED BY INVENTION

The game apparatus as shown in the above-mentioned patent related document 1 displays orders of keys of the commands, each of which is comprised of two or more key inputs. But, the premise is that the input device connected with the game apparatus is a specific one kind, so that it is not possible to cope with the input device having a different key structure.

Then, the object of the invention to provide a game apparatus having an input navigation function and an online game program wherein in the game apparatus connectable with the input devices having two or more kinds of different key structures, the key to be operated in the connected input device can be properly instructed.

MEANS FOR SOLVING PROBLEMS

A first aspect of the invention is game apparatus having input navigation function for executing a game in such a manner that two or more game apparatuses (1) operated by respective players are connected with a server (3) through a public communication line (2) and communicate with said server, so that a stage (STG) for an online game is formed in a virtual space of each of said game apparatuses (1) and an operation character (PCR) to be operated by said player of said game apparatus and another operation characters (ACR) to be operated by said players of another game apparatuses are displayed on said stage;

said operation character and another operation characters displayed on said stage being capable of exchanging action messages (MSG) with each other between said players who operate said operation character and another operation characters through said server, said game apparatus comprising:
input device discriminating means (9) that discriminates a kind (13A, 13B, 13C, . . . ) of said input device connected with said game apparatus and stores its result;
a memory that stores a key navigation table, said key navigation table (KNT) that sets keys (KY) to be operated by said player with respect to said action messages (MSG) delivered from said server, corresponding to kinds (KD) of said input devices connectable with said game apparatus;
message display means that displays said action message on a display (11) when said action message is delivered from said server; and
guide icon display means (8) that displays a key (KY) to be operated by said player corresponding to said input device that discriminated through said input device discriminating means on said display as a guide icon (27) by referring to said key navigation table when said action message is delivered.

A second aspect of the invention is the game apparatus having input navigation function, wherein there are two or more kinds of said action messages (MSG1, MSG2, MSG3, . . . ), and said key navigation table (KNT) sets keys (KY) to be operated by said player every each kind of said action messages.

A third aspect of the invention is the game apparatus having input navigation function, wherein said game apparatus further comprises signal processing means (8) that processes signals from said input device, and said signal processing means processes said signals from said keys corresponding to respective action messages shown in said key navigation table by interpreting all said signals as the same meaning even if said signal is inputted from said key of a different kind of input device (13A, 13B, 13C, . . . ).

A fourth aspect of the invention is online game program (GPR) to be used in a computer for executing a game in such a manner that two or more computers (1) operated by respective players are connected with a server (3) through a public communication line (2) and communicate with said server (3), so that a stage (STG) for an online game is formed in a virtual space of each of said computers and an operation character (PCR) to be operated by said player of said computer and another operation characters (ACR) to be operated by players of another computers are displayed on said stage;

said operation character and another operation characters displayed on said stage being capable of exchanging action messages (MSG) with each other between said players who operate said operation character and another operation characters through said server, said online game gets said computer to function as the following:
input device discriminating means (9) that discriminates a kind of said input device (13A, 13B, 13C, . . . ) connected with said computer and stores its result;

a memory that stores a key navigation table, said key navigation table (KNT) that sets keys to be operated by said player with respect to said action messages (MSG) delivered from said server, corresponding to kinds (KD) of said input devices connectable with said computer;

message display means that displays said action message on a display (11) when said action message is delivered from said server; and guide icon display means (8) that displays a key (KY) to be operated by said player corresponding to said input device that discriminated through said input device discriminating means on said display as a guide icon (27) by referring to said key navigation table when said action message is delivered.

EFFECTS OF INVENTION

According to the invention, the input device discriminating means (9) discriminates the input device connected with the game apparatus and the guide icon display means (8) displays the key (KY) to be operated by the player corresponding to the connected input device as the guide icon (27) by referring to the key navigation table (KNT) when the action message is delivered, so that the player can properly perceive the key to be operated.

If the key navigation table (KNT) sets the key to be operated by the player every each kind of the action messages, a different procedure is possible every kind of the respective action messages, and it is possible to do a delicate procedure thereby.

The signal processing means processes the signals from the respective keys shown in the key navigation table by interpreting all signals as the same meaning even if the signal is inputted from the keys of the different kind of two or more input devices (13A, 13B, 13C, . . . ), so that it is possible to do a unified processing on the respective action messages even in the different kind of input device.

In case where the game apparatus is one connectable with the input devices having two or more different key structures, that is one connectable with different kinds of the input devices, it is possible to select and operate the proper keys without being puzzled due to a difference between the key structures.

The number in parentheses shows the corresponding element in the drawings for the sake of convenience, accordingly, the descriptions are not restricted and bound by the descriptions on the drawings.

An embodiment of the invention is now explained, referring to appended drawings.

Figure 1:
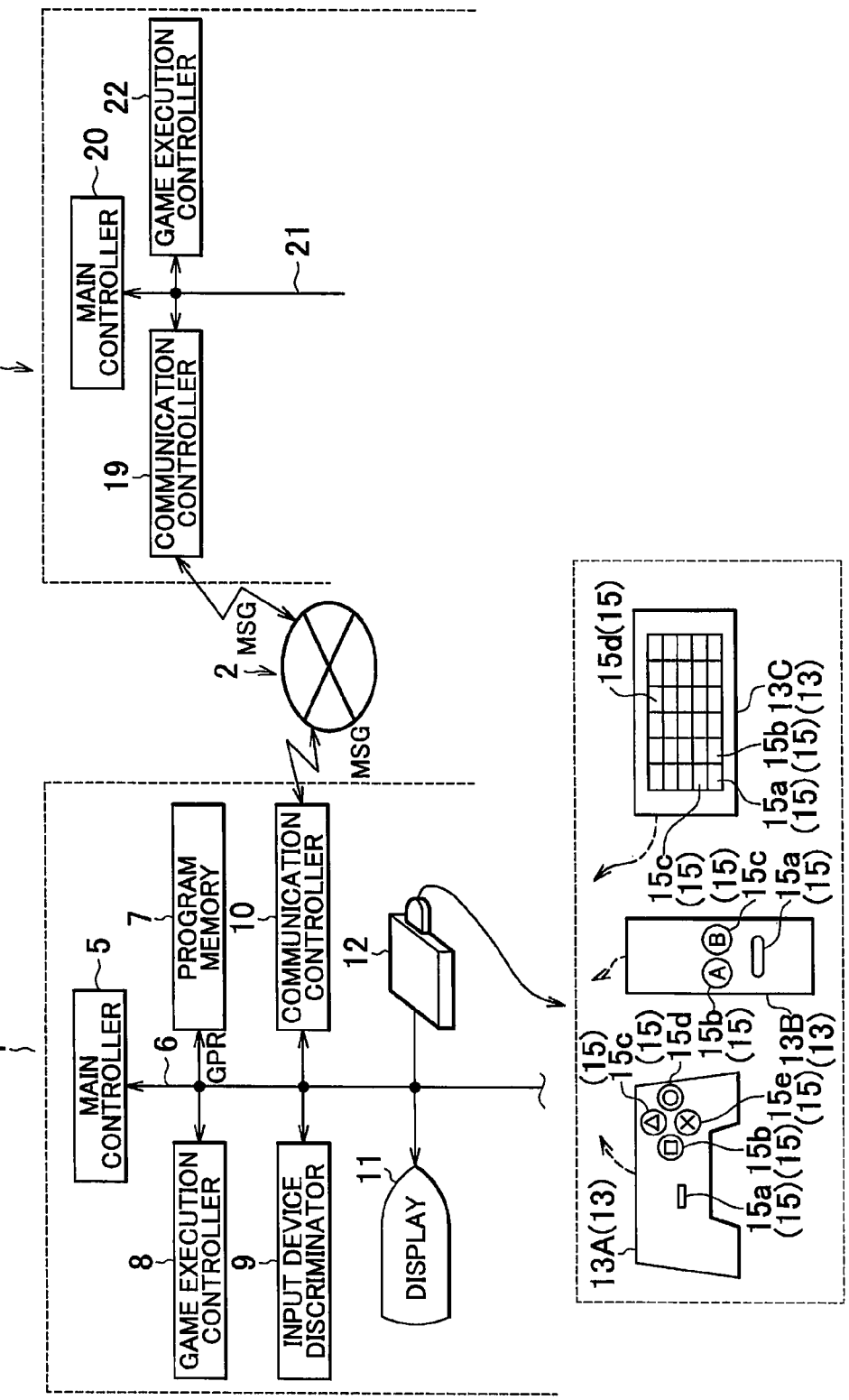
FIG. 1 is a control block diagram of a game apparatus and a server exemplarily shown, to which the invention is applied.

FIG. 1 shows a game apparatus 1 comprising a computer and a server 3 connected therewith via a public communication line 2. The game apparatus 1 has a main controller 5, and a program memory 7, a game execution controller 8, an input device discriminator 9, a communication controller 10, a display 11 and an interface 12 are connected with the main controller 5 via a bus line 6. Various kinds of input devices 13A, 13B and 13C can be selectively connected with the input interface 12, each input device 13A, 13B or 13C has a different key structure, and two or more keys 15a, 15b, 15c, 15d, . . . (that are referred to as only keys 15 if the respective keys are not necessary to be differentiated) are provided so as to output signals that are individually set and defined in the respective input devices 13A, 13B and 13C to the game apparatus 1. FIG. 1 exemplarily shows only portions pertinent to the invention, but does not show the whole structure of an actual portable game apparatus 1. Besides, the input device is referred to as 13A, 13B, 13C . . . if its kind is necessary to be differentiated or is referred to as 13 only if not necessary.

The game apparatus 1 as shown in FIG. 1 executes functions shown in respective blocks as shown in FIG. 1 in such a manner that a computer reads and executes game program stored in a memory, such as the program memory 7 and the other well-known control program so that a CPU or a memory (not shown) time-dividedly operates by multitask. But, it is also possible to structure the game apparatus 1 by hardwares corresponding to the respective blocks. Otherwise, it is also possible to control each block by a CPU or a MPU dispersedly provided in each block.

The communication controller 10 of the game apparatus 1 is connected with the public communication line 2, such as the Internet and a telephone line, and a communication controller 19 of the server 3 is connected with the public communication line 2. The server 2 has a main controller 20, and a game execution controller 22 is connected with the main controller 20 via a bus line 21.

The game apparatus 1 and the server 3 have structures shown above. When a user plays a game, the input device to be used for the game is selected from the input devices 13A, 13B and 13C owned by himself (herself) and is connected with the input interface 12. If any input device is connected with the input interface 12, the input device discriminator 9 reads game program GPR that is an online game program stored in the program memory 7 and discriminates which input device 13 of the two or more kinds of input devices 13 connectable with the game apparatus 1, the input device connected with the input interface 12 is, that is, which of the input devices 13A, 13B, 13C it is by receiving and analyzing device identification signals outputted from the input device 13 to the input interface 12 based upon the game program GPR (this method is a well-known). If the kind of the input device 13 is discriminated, the discrimination result is stored in a memory (not shown). After discriminating the kind of the input device 13 connected with the input interface 12, the main controller 5 instructs the game execution controller 8 to execute the online game, communicating with the server 3 based upon the game program GPR.

Receiving this, the game execution controller 8 instructs the communication controller 10 to communicate the game apparatus 1 with the server 3 via the public communication line 2 so as to communicate with each other. The server 3 executes authentication procedure on the game apparatus 1 newly connected with a well-known method and confirms a connection qualification of the game apparatus 1 to the server 3. After the connection qualification is confirmed, the main controller 20 of the server instructs the game execution controller 22 to execute a predetermined online game between the server 3 and the game apparatus 1, reciprocally communicating with the game apparatus 1.

Many game apparatuses (not shown) are online connected with the server 3 via the public communication line 2 in addition to the game apparatus 1 as shown in FIG. 1. The game execution controller 22 controls to execute a game online between each game apparatus 1 and the server 3, always communicating with such many game apparatuses similar to the game apparatus 1 via the public communication line 2. Such an online game system is generally referred to as Massively Multiplayer Online (MMO) game.

Figure 2:
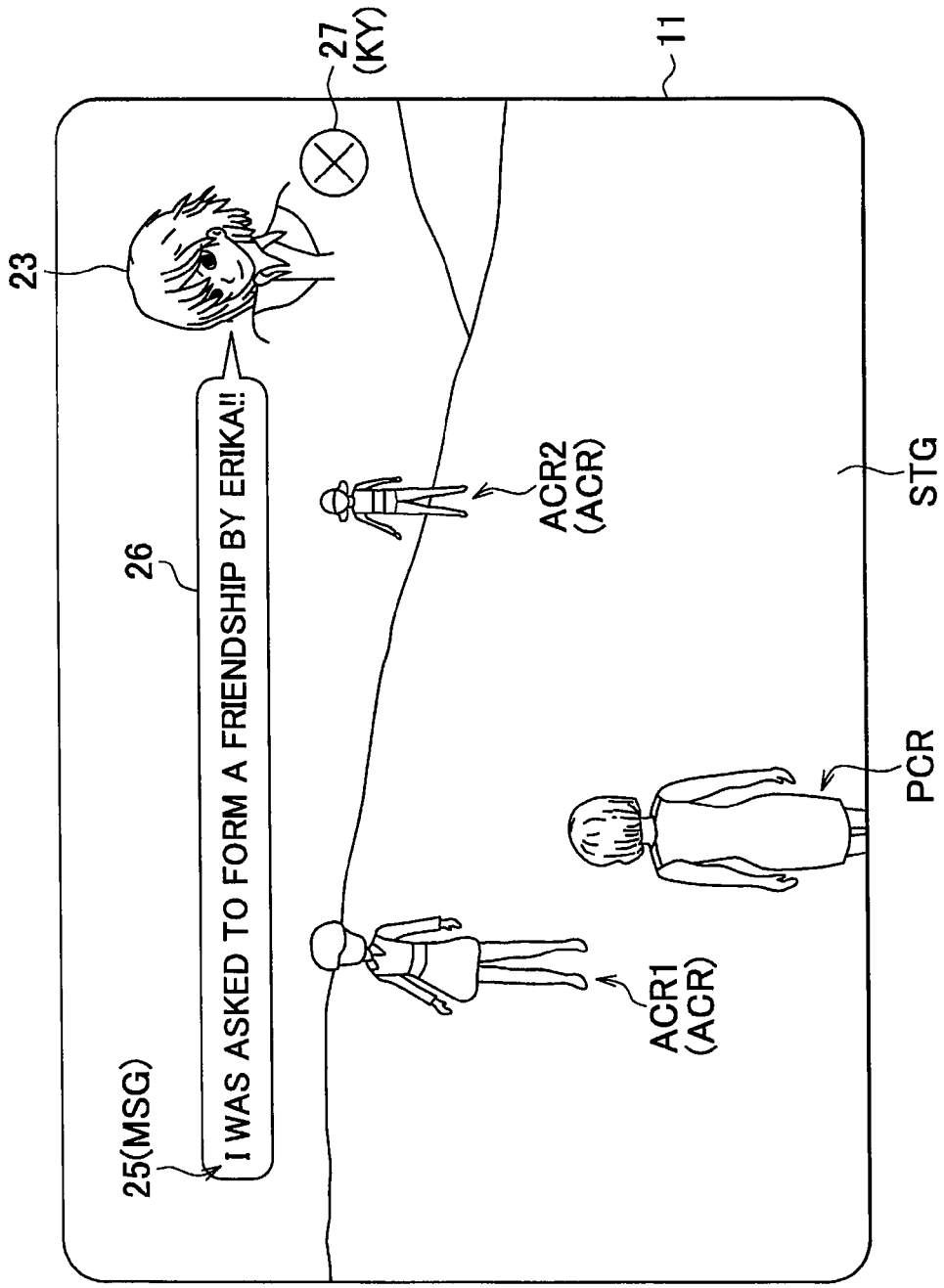
FIG. 2 is an example of a guide screen displayed on the game apparatus.

As mentioned above, extremely many playes can play the game having the same title online with respective game apparatuses 1 in such a manner that if each player operates each game apparatus (game terminal), the game program GPR of each game apparatus 1 and the control program of the server 3 operate together so as to locate respective operation characters in a stage in a virtual space formed in a memory of the server 3 and to get the operation characters to act. In the game apparatus 1 of each player, the game execution controller 8 forms the virtual space dedicated for the game apparatus in a memory space (not shown) according to the game program GPR when data is supplied from the server 3, a stage STG for an online game is formed as a copy of the stage that has been formed in the server 3 and is displayed on the display 11 as shown in FIG. 2. Then, the game proceeds in such a manner that the player gets his (her) operation character PCR to act in the stage in the server 3 and confirms a result of the action by watching a screen of the copy of the stage STG in the server 3 displayed on the display 11 of the game apparatus 1.

In a stage ATG (a copy of the stage of the server 3) inside the game apparatus 1 where the operation character PCR to be operated by the player who is playing the online game is moved, another operation characters ACR1, ACR2 . . . to be operated by another players (another game apparatuses), that are near a coordinate position in the virtual space where the operation character PCR exists are also displayed based upon data from the server 3, as shown in FIG. 2. A method of displaying the operation characters ACR of another players excluding the player in such a MMO game is well-known, so that its detailed explanation is not mentioned.

It is possible to exchange action messages between the operation character PCR displayed on the stage STG displayed on the display 11 and another operation characters ACR1, ACR2 . . . to be operated by another players, that is, between all operation characters displayed on the stage STG via the server 3 through the players who operate these operation characters. The invention is applied to such a case where the action message is delivered to the player from another operation character ACR operated by another player. Such a case is mentioned hereinafter.

A plurality of action messages MSG, such as MSG1, MSG2, MSG3, . . . , are set, forming pairs with corresponding action message sentences 25 in the game program GPR. For example, the action messages are "Help of production" message MSG1 shown by the action message sentence 25 "I was asked to produce arms by ○ ○ ○ ○ (someone)!", "invitation to form a friendship" message MSG2 shown by the action message sentence 25 "I was asked to form a friendship by ○ ○ ○ ○ (someone)!", and "transaction" message MSG3 shown by the action message sentence 25 "I was asked to have a business relationship by ○ ○ ○ ○ (someone)!".

If the action message MSG is delivered through the server 3 from another operation character ACR on the stage STG displayed on the display 11 of the player to the game apparatus 1, the main controller 5 analyzes associated information associated with the delivered action message MSG through the game execution controller 8 and does a procedure of informing the player that the action message MSG has been arrived from another operation character ACR according to the game program GPR through the display 11. For example, as shown in FIG. 2, a character icon 23 is displayed on the display 11 according to the game program GPR and the action message sentence 25 corresponding to the delivered action message MSG is displayed in such a manner that the character icon 23 talks to the player 23. Concretely speaking, a speech balloon 26 that is gotten out of the character icon is displayed and the action message sentence 25, that is, "I was asked to form a friendship by Erika!!" is displayed in the speech balloon 26.

The game execution controller 8 displays a guide icon 27 when displaying the character icon 23, and a key KY to be operated after the player confirms the action message MSG is displayed on the guide icon 27. Such a display procedure is done by the following routines.

Figure 5:
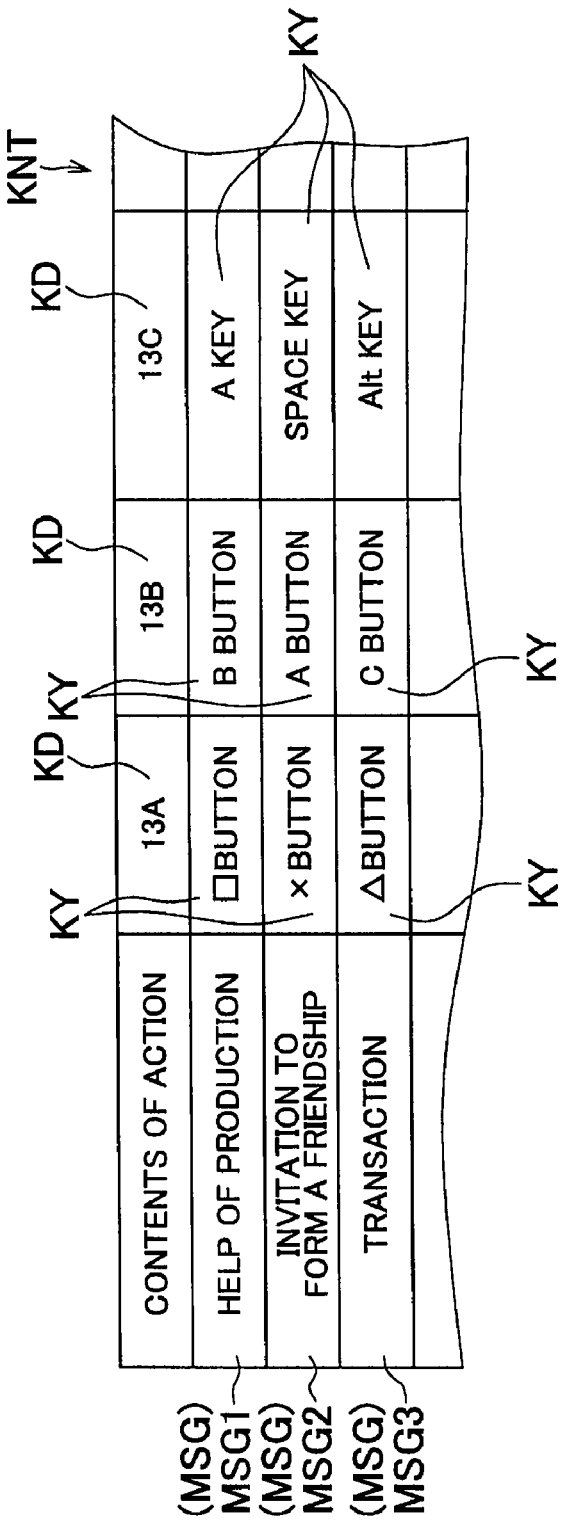
FIG. 5 is an example of a key navigation table.

The game execution controller 8 reads the kind of the input device 13 that is presently connected with the game apparatus 1 (that was already discriminated by the input device discriminator 9) out of a memory (not shown), and determines the guide icon 27 to be displayed by referring to a key navigation table KNT stored in a memory (not shown) when displaying the message sentence 25 corresponding to the action message MSG on the display 11. That is, the key navigation table KNT respectively sets keys KY to be operated by the player to the action messages MSG delivered from the server 3 through the public communication line 2 according to the game program GPR, corresponding to kinds KD of the input devices 13A, 13B, 13C . . . connectable with the game apparatus 1, as shown in FIG. 5. The game execution controller 8 determines the guide icon 27 to be displayed on the display 11 by referring to the key navigation table KNT according to the kinds MSG1, MSG2, MSG3 . . . of the action message MSG delivered from the server 3.

Figure 3:
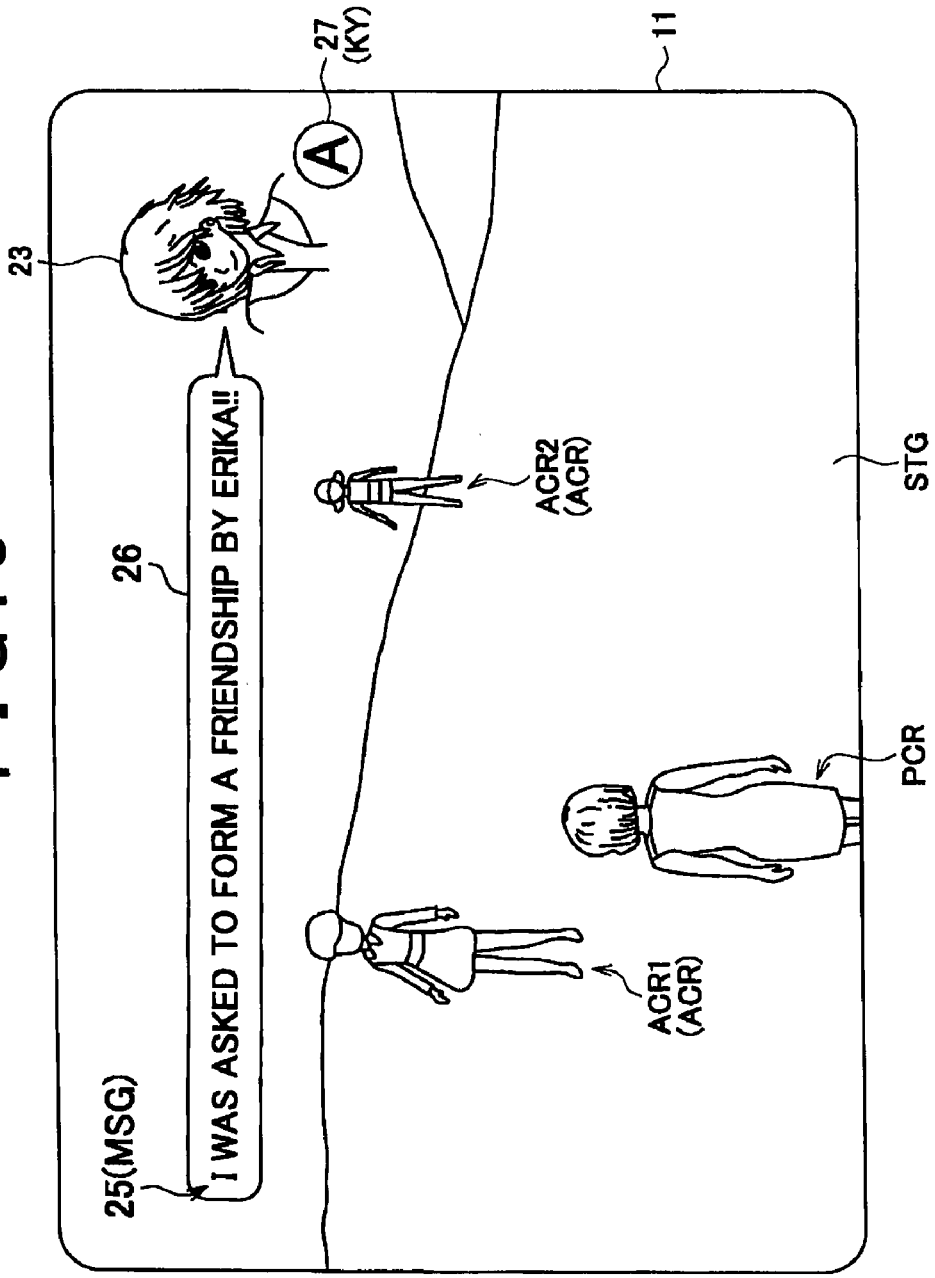
FIG. 3 is the other example of the guide screen displayed on the game apparatus.

If the action message MSG that is the "invitation to form a friendship" message MSG 2 is delivered from the server 3 in a case where the kind KD of the input device 13 connected with the game apparatus 1 is 13A, for example, the game execution controller 8 determines the guide icon 27 to be displayed as the icon 27 that shows X button according to the key navigation table KNT and displays this on the display 11 as shown in FIG. 2. If the action message MSG that is the "invitation to form a friendship" message MSG2 is delivered from the server 3 in a case where the kind KD of the input device 13 connected with the game apparatus 1 is 13B, the game execution controller 8 determines the guide icon 27 to be displayed as the icon 27 that shows A button according to the key navigation table KNT as shown in FIG. 3 and displays this on the display 11. If the action message MSG that is the transaction message MSG3 is delivered from the server 3 in a case where the kind KD of the input device 13 connected with the game apparatus 1 is 13C, the game execution controller 8 determines the guide icon 27 to be displayed as the icon 27 that shows Alt key according to the key navigation table KNT and displays this on the display (not shown).

Even if any kind of input device 13 is connected with the game apparatus 1, the game apparatus 1 thus discriminates the kind KD of the input device 13 presently connected and immediately displays the guide icon 27 on which the key KY to be operated, is displayed corresponding tot he kind of the action message MSG delivered from the server 3, such as MSG1, MSG2, MSG3, in the input device 13A, 13B, 13C which kind was discriminated.

The player operates the key 15 that corresponds to the key KY shown on the guide icon 27 displayed on the display 11 so as to output predetermined signals to the game apparatus 1 through the input interface 12. If the player presently connects the input device 13A with the game apparatus 1, for example, the guide icon 27 that shows the key 15e (KY) of X button is displayed on the display 11 of the game apparatus 1 as shown in FIG. 2, so that the player operates the key 15e of the input device 13A. If the player presently connects the input device 13B with the game apparatus 1, the guide icon 27 that shows the key 15*b* (KY) of A button is displayed on the display 11 of the game apparatus 1 as shown in FIG. 3, so that the player operates the key 15*b* of the input device 13B.

Figure 4:
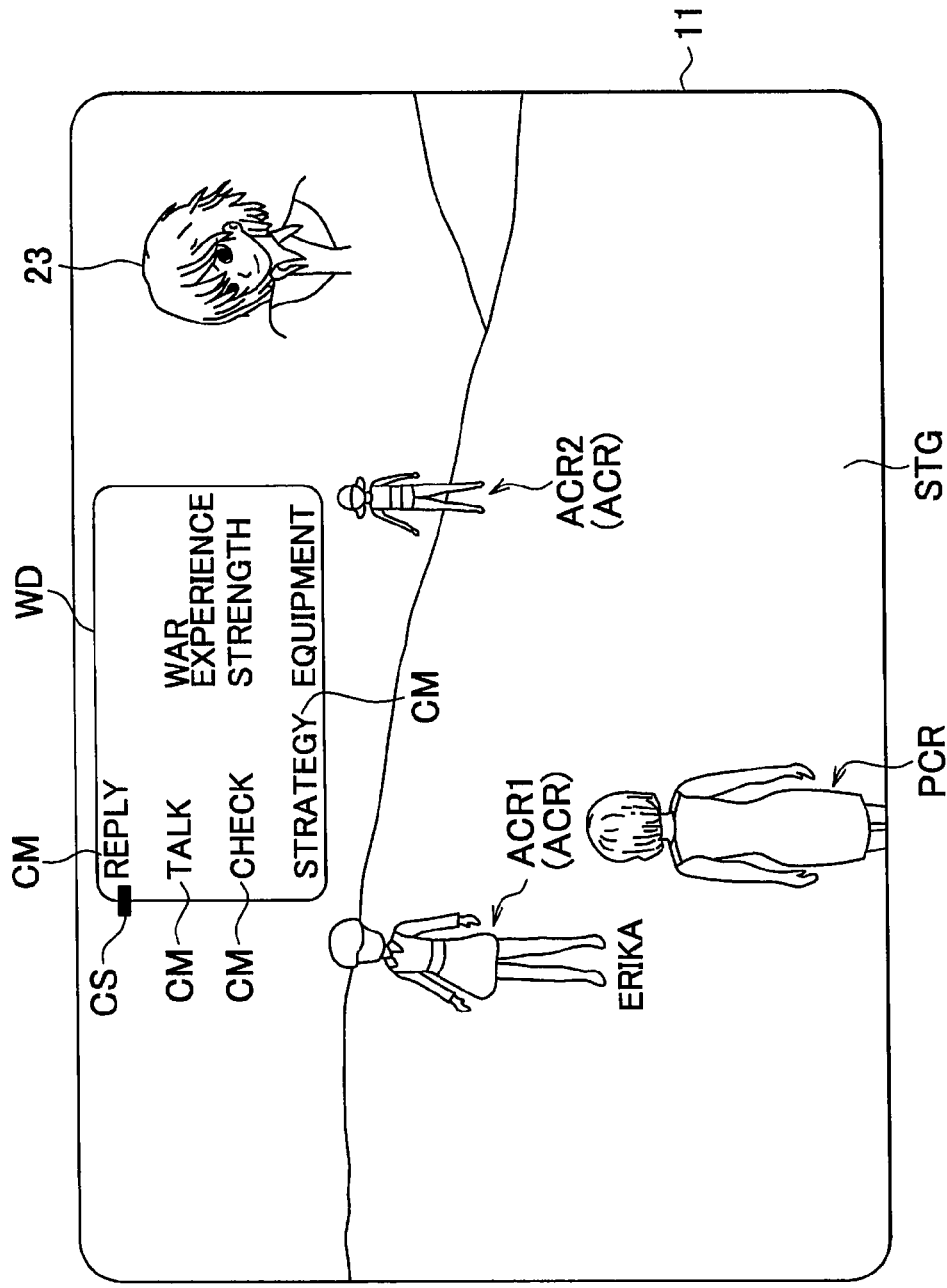
FIG. 4 is an example of a window display screen displayed on the game apparatus.

In the game apparatus 1, the game execution controller 8 does a procedure corresponding to the key 15 operated by the player, that is, the procedure corresponding to the action message MSG delivered from the server 3, concretely speaking, the procedure of opening a window WD that corresponds to the kind of the action message MSG according to the game program GPR. The procedures corresponding to the respective action messages MSG are predetermined according to the kinds of the action messages MSG. Then, the signals from the keys 15 corresponding to the kinds MSG1, MSG2, MSG3 . . . of the respective action messages MAG that are shown in the key navigation table KNT are interpreted as the same meaning even if the signal is inputted from the key 15 of the different kind of the input device 13, and the windows WD corresponding to the kinds MSG1, MSG2, MSG3 . . . are opened as shown in FIG. 4, for example and the player is invited to input. On this window WD, two or more commands CM including the commands CM that corresponds to the actions the player can take in connection with the delivered action message MSG are displayed (the command having no direct relation to the delivered action message MSG may be included in the window WD). The player operates a cursor CS that is displayed together with the window WD so as to so select the command CS proper to a response to the delivered action message MSG. In case of FIG. 4, "Reply" is selected as the command CS.

Even if any kind of the input device 13 having a different key structure is connected with the game apparatus 1, the game apparatus 1 displays the key (KY) to be operated to the action message MSG through the guide icon 27, so that the player can operate the proper input device 13 without being puzzled.

The invention claimed is:

1. A game apparatus connectable to a second game apparatus via a server over a public communication line, said game apparatus configured for exchanging action messages through said server, between a first operation character to be operated by a first player of said game apparatus and a second operation character to be operated by a second player of said second game apparatus, said game apparatus comprising:
   a stage producing means for producing a stage for an online game in a memory of said game apparatus as a copy produced in said server based upon data supply from said server via said public communication line, wherein said first operation character and said second operation character are displayed on said stage;
   an input interface selectively connectable with two or more kinds of input devices, each of the two or more kinds of input device having different input key structures;
   an input device discriminating means for discriminating between the two or more kinds of input device, wherein when an input device of the two or more kinds of input devices is connected to the input interface, said input device discriminating means analyzes a device identification signal outputted by said input device and identifies which of the two or more kinds of input devices is connected to the input interface and stores a discrimination result in said memory;
   said memory storing action message sentences corresponding to said action messages;
   a message sentence displays means that analyzes an action message of said action messages transmitted from said second operation character to said first operation character via delivery from said server and displays said corresponding action message sentence on a display of said game apparatus;
   said memory storing a key navigation table, wherein for each of the two or more kinds of the input devices, said key navigation table contains cross-reference information for keys of the corresponding key structure to be operated by said first player and said action messages, wherein a plurality of keys are cross-referenced to a plurality of said action messages for each of the two or more kinds of input devices; and
   a guide icon display means that displays a key to be operated by said first player on said display as a guide icon corresponding to said action messages, based on said discrimination result, when said action message from said second operation character is delivered from said server to said first operation character.

2. The game apparatus according to claim 1, wherein said game apparatus further comprises signal processing means that processes signals from each of said two or more kinds of input devices, and said signal processing means processing signals from said keys corresponding to respective action messages stored in said key navigation table by interpreting all said signals of the respective action message as the same meaning based upon said key navigation table even if said signal is inputted from a key of a different kind of input device.

3. A non-transitory computer-readable medium having instructions stored thereon, which when executed by a processor of a game apparatus, causes said game apparatus to perform a process, wherein said game apparatus is connectable to a second game apparatus via a server over a public communication line, said game apparatus having stage producing means for producing a stage for an online game in a memory of said game apparatus as a copy produced in said server, said game apparatus configured for exchanging action messages, through said server, between a first operation character to be operated by a first player of said game apparatus and a second operation character to be operated by a second player of said second game apparatus, said process comprising:
   (a) when an input device is connected to an input interface of said game apparatus, discriminating said input device by analyzing a device identification signal outputted by said input device to identify which of two or more kinds of input devices having different key structures is connected to the input interface and storing a discrimination result in said memory;
   (b) when an action message transmitted from said second operation character is delivered from said server to said first operation character on said game apparatus, analyzing said action message from said second operation character and displaying an action message sentence corresponding to said action message on a display provided in said game apparatus by accessing said action message sentence from said memory in which action message sentences corresponding to action messages are stored; and
   (c) displaying on said display a key to be operated by said first player as a guide icon, based on said discrimination result, by accessing a key navigation table stored in said memory, wherein for each of the two or more kinds of input devices, said key navigation table contains cross-reference information for a plurality of keys to be operated by said first player corresponding to said action messages, whereby said guide icon displayed corresponds to said input device connected to said input interface.

* * * * *